US008583166B2

(12) United States Patent
Kan et al.

(10) Patent No.: US 8,583,166 B2
(45) Date of Patent: Nov. 12, 2013

(54) MOBILE TERMINAL DEVICE

(75) Inventors: Yoshinori Kan, Tokyo (JP); Shintaro Suzuki, Tokyo (JP); Hideyuki Matsushima, Tokyo (JP)

(73) Assignee: Fujitsu Mobile Communications Limited, Kawasaki (JP)

( * ) Notice: Subject to any disclaimer, the term of this patent is extended or adjusted under 35 U.S.C. 154(b) by 1162 days.

(21) Appl. No.: 12/272,938

(22) Filed: Nov. 18, 2008

(65) Prior Publication Data

US 2009/0201359 A1    Aug. 13, 2009

(30) Foreign Application Priority Data

Feb. 8, 2008    (JP) .................................. P2008-29407

(51) Int. Cl.
*H04M 1/00*    (2006.01)
(52) U.S. Cl.
USPC ..................... 455/550.1; 379/434; 455/414.1; 455/422.1; 455/551
(58) Field of Classification Search
USPC .................... 348/14.01–14.16; 370/259–271, 370/351–357; 709/201–207, 217–248; 455/550.1–560, 575.1–575.9, 455/90.1–90.3, 412.1–426.2; 704/270–278
See application file for complete search history.

(56) References Cited

U.S. PATENT DOCUMENTS

| | | | | |
|---|---|---|---|---|
| 5,930,723 A * | 7/1999 | Heiskari et al. | ............... | 455/518 |
| 5,970,417 A * | 10/1999 | Toyryla et al. | ................ | 455/519 |
| 6,385,461 B1 * | 5/2002 | Raith | ............................ | 455/518 |
| 7,283,833 B2 * | 10/2007 | Fukui et al. | ................... | 455/517 |
| 7,383,250 B2 * | 6/2008 | Scian et al. | ............................ | 1/1 |
| 7,446,795 B2 * | 11/2008 | Rengaraju et al. | .......... | 348/14.01 |
| 7,693,510 B2 * | 4/2010 | Shaw | ............................. | 455/416 |
| 7,822,185 B2 * | 10/2010 | Nguyen et al. | ............ | 379/202.01 |
| 2002/0037736 A1 * | 3/2002 | Kawaguchi et al. | ........... | 455/518 |
| 2003/0017836 A1 * | 1/2003 | Vishwanathan et al. | ....... | 455/517 |
| 2004/0082352 A1 * | 4/2004 | Keating et al. | ................ | 455/519 |
| 2005/0010658 A1 * | 1/2005 | Nettamo | ....................... | 709/223 |
| 2005/0031109 A1 * | 2/2005 | Fernandez et al. | ........ | 379/202.01 |

(Continued)

FOREIGN PATENT DOCUMENTS

| | | |
|---|---|---|
| JP | 2002-010344 A | 1/2002 |
| JP | 2005-354274 A | 12/2005 |
| JP | 2007-267125 A | 10/2007 |
| JP | 2007-325312 A | 12/2007 |

OTHER PUBLICATIONS

JP Office Action dated Feb. 7, 2012 as received in application No. 2008-029407.

*Primary Examiner* — Hemant Patel
(74) *Attorney, Agent, or Firm* — Maschoff Brennan (57) ABSTRACT

A mobile terminal device includes an input unit for inputting addressee information data relevant to an addressee of a videophone communication including at least a phone number, a data storage unit for storing a plurality of the addressee information data inputted by the input unit in a group, a retrieval unit for retrieving one of plural groups stored in the data storage unit, a set unit for executing a retrieval process from the plural groups stored in the data storage unit using the retrieval unit based on the set addressee information data of the addressee after setting the addressee of the videophone communication to set the addressee corresponding to the addressee information data of the retrieved group as the addressee of the videophone communication, and a communication unit for executing the videophone communication based on the addressee information of the addressee of the videophone communication set by the set unit.

4 Claims, 9 Drawing Sheets

(56) References Cited

U.S. PATENT DOCUMENTS

| | | | |
|---|---|---|---|
| 2005/0143135 A1* | 6/2005 | Brems et al. | 455/564 |
| 2006/0111135 A1* | 5/2006 | Gray et al. | 455/519 |
| 2006/0171378 A1* | 8/2006 | Harris et al. | 370/352 |
| 2009/0089316 A1* | 4/2009 | Kogan et al. | 707/102 |
| 2009/0144406 A1* | 6/2009 | Kojo et al. | 709/223 |
| 2010/0029314 A1* | 2/2010 | Fukushima | 455/518 |

* cited by examiner

MOBILE TERMINAL DEVICE

BACKGROUND OF THE INVENTION

1. Field of the Invention

The present invention relates to a mobile terminal device, and more particularly, a mobile terminal device with a videophone function for allowing simultaneous videophone communication among a plurality of mobile terminal devices.

2. Related Art

The use of the mobile terminal device such as a mobile phone allows the videophone communication as disclosed in Japanese Unexamined Patent Application Publication No. 2005-354274. Likewise the voice call, in the videophone communication with the mobile phone, the mobile phone of the addressee is called from that of the addresser. The call reception signal through the call process to the mobile phone of the addressee is received to establish the videophone communication between the mobile phones of the addresser and the addressee.

The addresser of the mobile phone may directly input the phone number of the addressee on an input screen of the addressee so as to call the mobile phone thereof.

The mobile phone includes a address book function which lists registered addressees such that the user selects the desired registered addressee information from the displayed list of the address book to make a phone call.

Recently, the videophone system allows not only one-to-one (addresser-addressee) communication but also simultaneous communication established with a group videophone function by inputting or selecting a plurality of addressee information data.

When the group videophone function is used to call plural addressees, the phone numbers of the addressees are required to be directly input on the screen where the addressee information is displayed. Alternatively, the desired addressee information is required to be selected from the address book. In the case where the simultaneous communication may be established among maximum of five mobile phones, the user has to repeat the operation for inputting the addressee information on the input display four times. When the user uses the address book, the operation for selecting the desired addressee information from the list has to be repeated four times.

Even if the addressees communicated with the user through the group videophone system are regular members such as family, close friends and members of the circle, the user as the addresser has to input or select the addressee information for every call, thus bothering the user.

SUMMARY OF THE INVENTION

Accordingly, it is an object of the present invention to provide a mobile terminal device which allows the user to select the addressee information required to make the group videophone call efficiently.

The above and other objects can be achieved according to the present invention by providing, in one aspect, a mobile terminal device which includes an input unit for inputting addressee information data including at least a phone number relating to an addressee of a videophone communication, a data storage unit for storing a plurality of the addressee information data input by the input unit in a group, a set unit for setting a plurality of addressees corresponding to the plurality of the addressee information data correlated to the group as the addressee of the videophone communication based on selection of the group stored in the data storage unit, and a communication unit for executing the videophone communication based on the addressee information data of the addressee of the videophone communication set by the set unit.

In another aspect, the present invention also provides a mobile terminal device which includes an input unit for inputting addressee information data including at least a phone number relating to an addressee of a videophone communication, a data storage unit for storing, as a group, a plurality of the addressee information data inputted by the input unit, a retrieval unit for retrieving one of a plurality of groups stored in the data storage unit, a set unit for executing a retrieval process from the plurality of groups stored in the data storage unit using the retrieval unit based on the set addressee information data of the addressee after setting the addressee of the videophone communication to set the addressee corresponding to the addressee information data of the retrieved group as the addressee of the videophone communication, and a communication unit for executing the videophone communication based on the addressee information of the addressee of the videophone communication set by the set unit.

In a further aspect of the present invention, there is also provided a mobile terminal device comprising: an input unit configured to input addressee information data including at least a phone number relating to an addressee of a videophone communication; a data storage unit configured to store, as a group, a plurality of the addressee information data inputted by the input unit; a controller configured to index, after setting a first addressee as an addressee of the videophone communication, the group including the set addressee information from a plurality of groups stored in the data storage unit and to display a second addressee excluding the first addressee corresponding to the addressee information of the indexed group; and a communication unit configured to execute the videophone communication based on the addressee information data of the set addressee of the videophone communication, wherein when the second addressee is selected after the displaying, the second addressee is set as an addressee of the videophone communication in addition to the first addressee.

The mobile terminal device according to the present invention of the characters mentioned above allows a user to efficiently select the addressee information required to make videophone call for communication among plural mobile terminal devices.

The nature and further characteristic features of the present invention will be made clearer from the following descriptions made with reference to the accompanying drawings.

BRIEF DESCRIPTION OF THE DRAWINGS

In the accompanying drawings:

FIG. 6 shows an example of a screen for the group register process, in which

FIG. 8 shows an example of the screen for the phone call using the group register function, in which

FIG. 10 shows an example of the group retrieval screen before the group videophone call, in which

FIG. 12 shows an example of the group retrieval display during the videophone communication, in which

DESCRIPTION OF THE PREFERRED EMBODIMENTS

An embodiment of a mobile terminal device according to the present invention will be described hereunder with reference to the accompanying drawings.

Figure 1A:
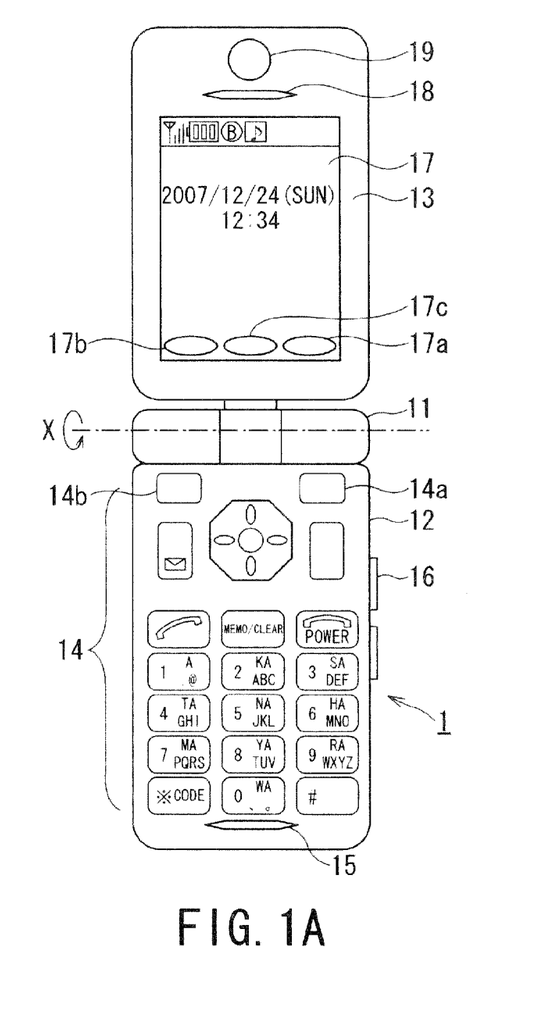
FIG. 1 shows an outer appearance of a mobile phone as an example of a mobile terminal device according to the present invention.
Figure 1B:
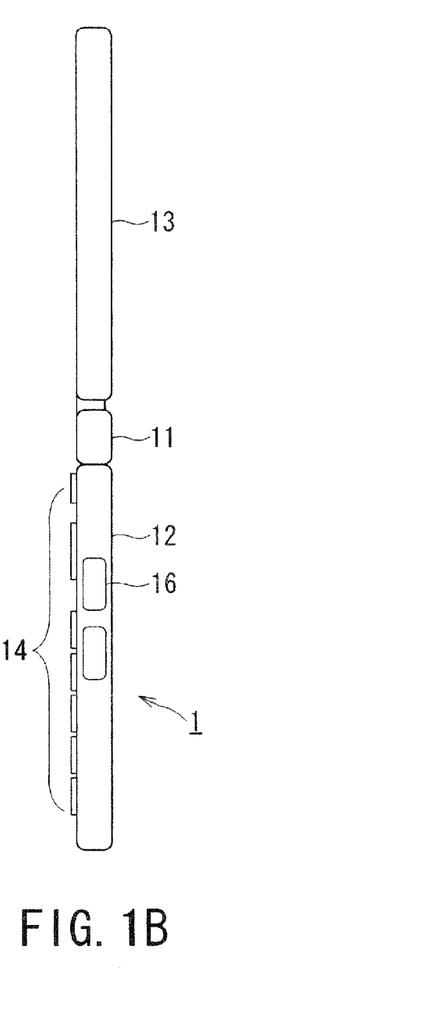

FIG. 1 shows an outer appearance of a foldable mobile phone 1 as an example of a mobile terminal device according to the present invention. FIG. 1A is a front view of the mobile phone 1 which is opened at substantially 180°, and FIG. 1B is a side view of the mobile phone 1 in the opened state.

Referring to FIGS. 1A and 1B, the mobile phone 1 is formed by connecting a first casing 12 and a second casing 13 by means of hinge at a hinge portion 11 so as to realize the structure foldable in an arrow direction X. An antenna (to be described later as an antenna 31 shown in FIG. 3) for signal transmission/reception is installed at a predetermined position inside the mobile phone 1. The mobile phone 1 communicates the electric wave with a base station, not shown, via the built-in antenna.

The first casing 12 includes operation keys 14 such as numeric keys from "0" to "9", a call key, a redial key, an end/power key, a clear key, and a menu key on the surface, through which various commands are inputted.

The first casing 12 further includes an arrow key and a return key each as the operation key 14 at the upper portion. The user operates the arrow key vertically or laterally to move a cursor in the corresponding direction. The user further depresses the return key to establish various functions. The return key is operated to execute the process displayed on a return key function display section 17c at the lower portion of a main display 17.

The first casing 12 includes a first soft key 14a and a second soft key 14b above the arrow key and the return key, respectively. A side key 16 which allows the user to operate the mobile phone 1 is formed on the side surface of the first casing 12. When the first soft key 14a, the second soft key 14b and the side key 16 are depressed inward of the first casing 12, allocated processes are performed, respectively. Functions performed through depression of the first and the second soft keys 14a and 14b correspond to the processes displayed on the soft key function display sections 17a and 17b at the lower portion of the main display 17, respectively.

The first casing 12 is provided with a microphone 15 below the operation keys 14 for collecting the user's voice over the phone.

The first casing 12 includes a battery pack, not shown, at the back side. When the end/power key is brought into "ON" state, the electric power is supplied to the respective circuits from the battery pack so as to be brought into the operable state.

On the other hand, the second casing 13 includes the main display 17 on the surface for displaying the reception state of the electric wave, the remaining battery level, and contents of the e-mail and simplified home page. In the embodiment, the addressee information selection screen before making the videophone call, or the screen for adding the member of the group on the line of the videophone may be displayed. The main display 17 includes an LCD, an organic EL display, and an inorganic EL display.

A receiver 18 is formed at a predetermined position above the main display 17 to allow the user to talk with the addressee. The mobile phone 1 is provided with a speaker, not shown, as a voice output portion other than the receiver 18 at a predetermined position for outputting the voice of the addressee on the line from the speaker.

An inner CCD camera 19 is disposed at the top portion of the second casing 13 for shooting a desired object. In the embodiment, the image data picked up by the user with the inner CCD camera 19 during the videophone communication are transmitted to the mobile phone of the addressee.

Figure 2A:
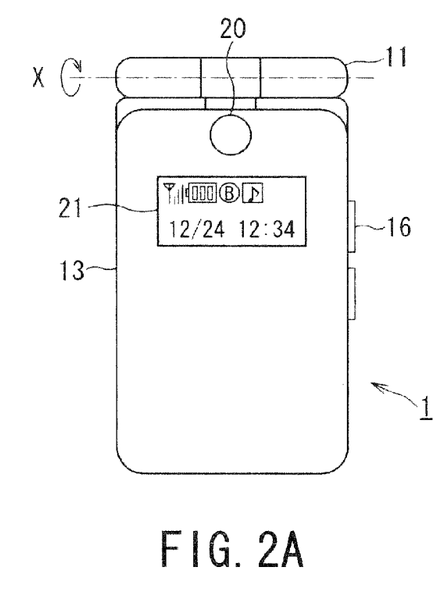
FIG. 2 shows an appearance of another mobile phone as an example of the mobile terminal device according to the present invention.
Figure 2B:
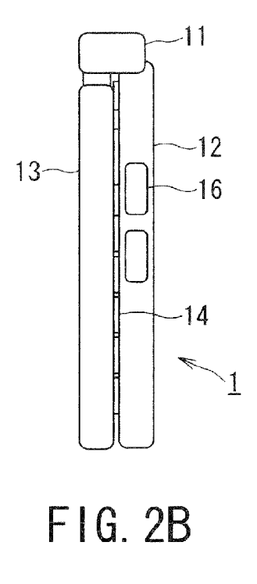

FIG. 2 shows another appearance of the foldable mobile phone 1 as the example of the mobile phone according to the present invention. The mobile phone 1 shown in FIG. 2 is folded in the arrow X direction from the state shown in FIG. 1 in a manner such that the first casing 12 and the second casing 13 substantially overlap with each other. FIG. 2A is a front view of the mobile phone 1 in the closed state, and FIG. 2B is a side view thereof.

An outer CCD camera 20 is provided on the upper portion of the second casing 13 for shooting the desired object. In the embodiment, the image data picked up by the user with the outer CCD camera 20 during the videophone communication are transmitted to the mobile phone of the addressee likewise the use of the inner CCD camera 19.

A sub-display 21 formed of an LCD, for example, is disposed below the outer CCD camera 20 for displaying pictographs of the antenna representing the current sensitivity level, the battery representing the remaining level of the battery of the mobile phone 1, and the current time.

Figure 3:
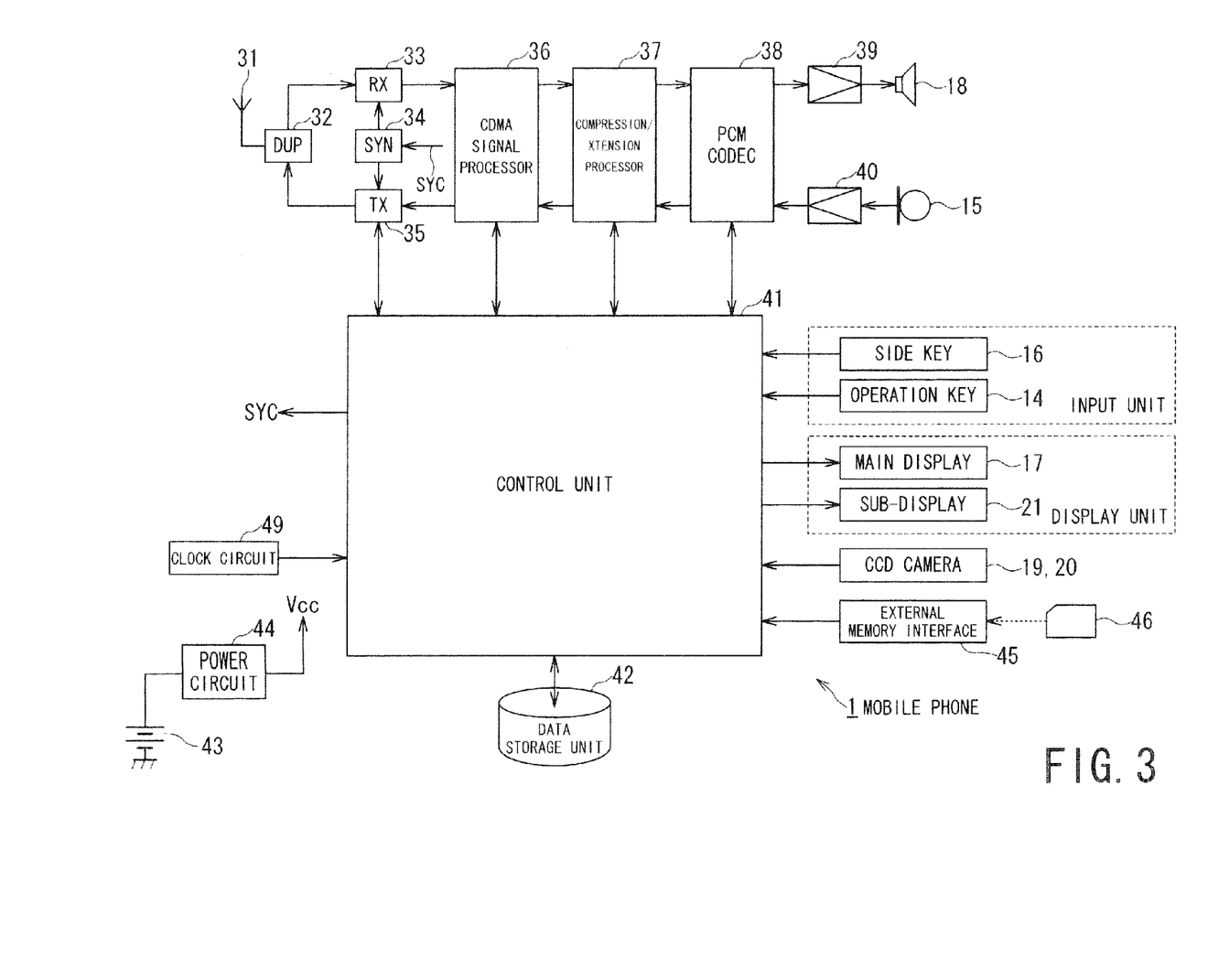
FIG. 3 is a block diagram showing an inner structure of the mobile phone as an example of the mobile terminal device according to the present invention.

FIG. 3 shows a structure inside the mobile phone 1 according to the embodiment.

A radio signal transmitted from the base station, not shown, is received by the antenna 31 and inputted to a reception circuit 33 via an antenna duplexer 32. The reception circuit 33 mixes the received radio signal with a local oscillation signal outputted from a frequency synthesizer 34 so as to be frequency converted (down converted) into an intermediate frequency signal. The reception circuit 33 orthogonally demodulates the down converted intermediate frequency signal so as to be output as a reception baseband signal.

The reception baseband signal from the reception circuit 33 is inputted to a CDMA signal processor 36 provided with a RAKE receiver, not shown. The RAKE receiver performs a reverse diffusion process of a plurality of paths contained in the reception baseband signal with the respective diffusion codes (the same diffusion code as that of the diffused reception signal). The signal of each of the reverse diffused paths has the phase adjusted, and then subjected to the coherent Rake synthesized. The Rake synthesized data series are subjected to de-interleaving and channel decoding (error correction decoding), which will be subjected to the binary data determination. As a result, reception packet data in accordance with a predetermined transmission format are obtained, and further inputted to a compression/extension processor 37.

The compression/extension processor 37 formed of a DSP allows a multiple separation unit, not shown, to separate the reception packet data output from the CDMA signal processor 36 for the respective media so as to decode with respect to the separated media.

A digital video image signal decoded by a video codec of the compression/extension processor 37 is inputted to a control unit 41 which displays a video image based on the digital video image signal outputted from the compression/extension processor 37 on the main display 17 via a not shown video RAM (for example, VRAM). The control unit 41 may be structured to display not only the received video image data but also those picked up by the inner CCD camera 19 and the outer CCD camera 20 on the main display 17 via the not shown video RAM.

The compression/extension processor 37 subjects the digital video image signal outputted from the control unit 41 to a compression coding, and multiplexes the video image data in the not shown multiple separation unit in accordance with a predetermined transmission format so as to be formed into a packet. The resultant transmission packet data are output to the CDMA signal processor 36.

The CDMA signal processor 36 subjects the transmission packet data outputted from the compression/extension processor 37 to a spectrum diffusion process using a diffusion code allocated to a transmission channel so as to output the spectrum diffused signal to a transmission circuit 35. The transmission circuit 35 modulates the spectrum diffused signal by using the digital modulation process such as QPSK, and synthesizes the digitally modulated transmission signal with a local oscillation signal generated by the frequency synthesizer 34 so as to perform the frequency conversion (up-converted) into a radio signal.

The transmission circuit 35 subjects the up-converted radio signal to high frequency amplification so as to reach the transmission power level commanded by the control unit 41. The high frequency amplified radio signal is supplied to the antenna 31 via the antenna duplexer 32 so as to be transmitted to the base station, not shown.

The mobile phone 1 is provided with an external memory interface 45 having a slot through which a memory card 46 is detachably inserted. The memory card 46, as one of a flash memory card of various types such as NAND type flash memory card and NOR type flash memory card, is capable of writing and reading various data including the image, voice and music via a 10-pin terminal.

The mobile phone 1 includes a clock circuit (timer) 49 for accurately measuring the correct time.

The control unit 41 is formed of a CPU, a ROM, and a RAM. The CPU executes various types of process in accordance with the program stored in the ROM or various application programs loaded into the RAM from a data storage unit 42. The CPU further generates various control signals to be supplied to the respective portions for centrally controlling the mobile phone 1. The RAM stores data required for the CPU to execute various types of process, and serves as a set unit for setting an addressee of the videophone communication, and a communication unit for establishing the videophone communication based on the addressee information set by the set unit.

The data storage unit 42 formed of a non-volatile memory, which is capable of electrically re-writing and erasing such as a flash memory element and an HDD, stores various application programs and data sets to be executed by the CPU of the control unit 41. A power circuit 44 generates a predetermined operation power voltage Vcc based on the output of a battery 43 so as to be supplied to the respective circuits.

A phone mode of the mobile phone 1 according to the present embodiment includes: a voice call mode for the phone communication using the microphone 15 and the receiver 18; and a videophone mode for the phone communication using the microphone 15, the speaker, the inner CCD camera 19, the outer CCD camera 20 and the main display 17.

The videophone mode includes a function capable of establishing the simultaneous communication among a plurality of mobile phones (hereinafter referred to as a group videophone). For example, in the case where the group videophone allows the communication among up to five mobile phones, the mobile phone 1 as the addresser is required to input four individual phone numbers of the addressees for calling.

The addressee information may be inputted by the function for directly inputting the phone number of the addressee via the numeric keys. The mobile phone 1 has the address book function which allows the user to select the desired phone number from those registered in the address book for calling.

Generally, one of the aforementioned processes has been employed to input or select the addressee information one by one. For the use of the aforementioned function for calling in the group videophone mode among up to five mobile phones, the addresser is required to input or select the addressee information four times. The more the number of the mobile phones for the group videophone communication is increased, the more the operation becomes complicated. This may prolong the time for starting the group videophone communication, and make the operation complicated.

Meanwhile, the mobile phone 1 according to the embodiment includes a group register function performed when using the group videophone function to realize the efficient call.

Figure 4:
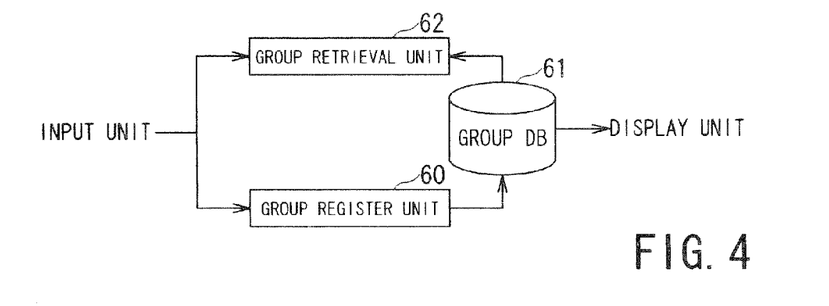
FIG. 4 is a block diagram showing a group register function of the embodiment of the present invention.

FIG. 4 is a function block diagram for explaining the group register function which allows the user to efficiently make a phone call when calling to the group videophone and during the communication. In the embodiment, maximum of five mobile phones are allowed to communicate with one another by simultaneously using the group videophone function.

The example with respect to the simultaneous calling of four addressees will be described. The number of the mobile phones which are allowed to establish the group videophone communication may be arbitrarily set without being limited to five.

A group register unit 60 registers a plurality of addressee information data as group members of a single group, and receives an input of the addressee information such as the phone number of the addressee required to be registered as the member of the group via the operation key 14 as the input unit. The addressee information may be inputted through selection from the address book or transmission/reception record, or directly inputting the phone number or the name of the member via the numeric key. Maximum of four addressee information data of the members of the single group may be registered. They may be edited, for example, added, deleted, and corrected. A plurality of groups may be arbitrarily registered, each of which may be categorized as "friend-college", "friend-job", and "family". The registered or the edited group will be stored in a group database 61.

The group database 61 serves as a data storage unit for storing information data of the members of the categorized group registered or edited by the group register unit 60. The group member information data stored in the group DB 61 may be referred appropriately.

A group retrieval unit 62 functions as a section for retrieving the group which contains the addressee of the communication as the group member from the group DB 61 in response to reception of an input of the information such as the name or the phone number of at least one addressee from the input unit, or reception of the addressee information during the videophone communication. In response to reception of the information with respect to plural addressees from the input unit, the group which contains all the addresses of the communication as the group members is retrieved. The retrieved result is outputted to the main display 17 as the display unit. If the group which contains at least one addressee having the input received does not exist in the group DB 61, the group retrieval unit 62 outputs the notification that no corresponding group is retrieved to the main display 17 using the pop-up as the notification function.

The group register process for registering arbitrary plural addressee information data as group members of the single group will be described. The group register process is executed for preliminarily registering the addressee information with respect to the desired addressee as the group members. The plural addressee information data categorized into groups are used upon the group videophone call such that the user calls plural addressees simultaneously with the simple operation.

Figure 5:
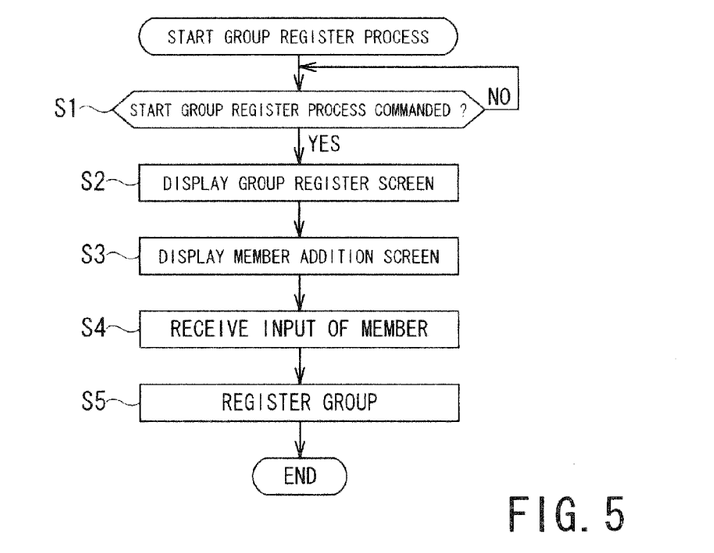
FIG. 5 is a flowchart showing a group register process.

FIG. 5 is a flowchart showing the group register process. FIG. 6 shows an example of a screen for executing the group register process.

With reference to FIG. 5, the group register unit 60 determines whether or not the command for executing the group register process has been received via the operation key 14 (step S1). If it is determined that the command for executing the group register process has not been received, the group register unit 60 brings the process into the standby state until reception of the command.

If it is determined that the command for executing the group register process has been received, the process proceeds to a step S2 where the group register unit 60 displays the group register screen on the main display 17.

Figure 6A:
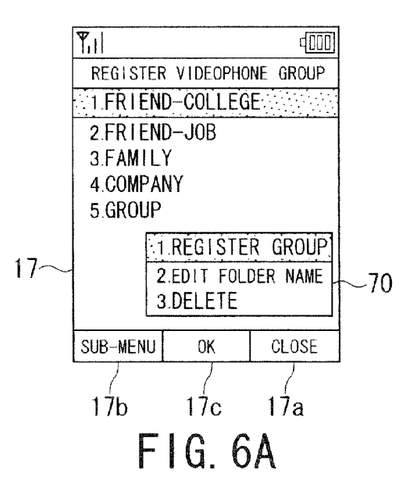
FIG. 6A shows a group register screen.

FIG. 6A shows an example of the group register screen. The group register screen displays a list of the registered groups or the group which can be newly registered. Upon depression of the second soft key 14b to which the "sub-menu" starting process displayed on the soft key function display section 17b is allocated, the group register unit 60 displays a sub-menu 70. The process including "1. register group", "2. edit folder name", and "3. delete" will be selectively displayed on the sub-menu 70.

In a step S3, after receiving a command for adding a group member of the group videophone, the group register unit 60 displays the member addition screen. The command for adding the group member is received by selecting the process of "1. register group" on the sub-menu 70 shown in FIG. 6A. Upon reception of the command for adding the group member, the group register unit 60 displays the member addition screen shown in FIG. 6B.

In a step S4, the group register unit 60 receives an input of the group member via the operation key 14 as the input unit. The group member is input through selection from the data listed in the address book or the transmission/reception records, or input of the phone number via the numeric key of the operation key 14.

Figure 6B:
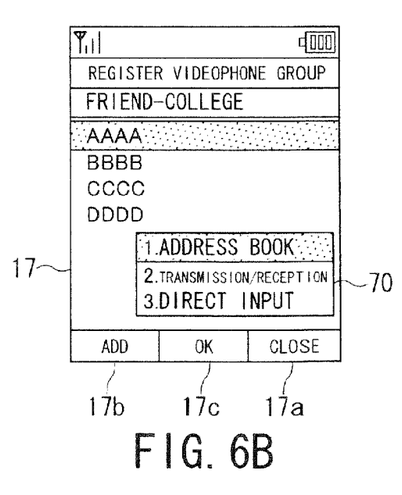
FIG. 6B shows a display where a group member is added.

Specifically, upon reception of the input of the member (addition) through depression of the second soft key 14b, the group register unit 60 displays the sub-menu as shown in FIG. 6B. The sub-menu 70 displays the mode for receiving the input of the group member.

When selection of "1. address book" is received, the group register unit 60 receives selection of the addressee information such as the phone number of the member required to be added from the address book.

When the selection of "2. transmission/reception record" is received, the group register unit 60 receives selection of the addressee information such as the phone number of the member required to be added from the transmission/reception record.

When the selection of "3. direct input" is received, the group register unit 60 receives input of the addressee information such as the name and the phone number of the member from the numeric key of the operation key 14.

The group register unit 60 displays the list of names of the addressees inputted and received as the group members, for example, "AAAA", "BBBB", "CCCC", and "DDDD" as shown in FIG. 6B.

In a step S5, the group register unit 60 stores the addressee information data of the group members which have been categorized to be inputted or selected and received in the group DB 61 for registration. The information with respect to the group members stored in the group DB 61 may be appropriately referred to as occasion demands.

When the group register unit 60 receives selection of the "2. edit folder name" displayed on the sub-menu 70 of the group register screen, editing of the selected group name is received. When the group register unit 60 receives selection of the "3. delete", the selected group is deleted from the group DB 61. The explanation of the group register process is finished.

The process for calling the group videophone using the group register function will be described.

Figure 7:
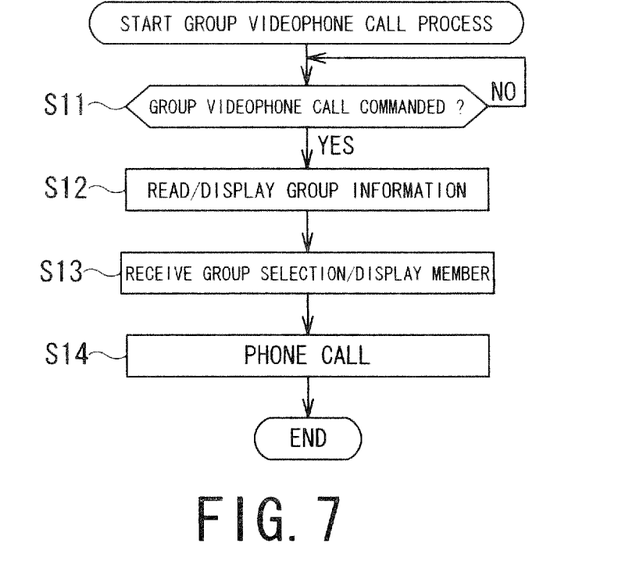
FIG. 7 is a flowchart showing a group videophone call process.

FIG. 7 is a flowchart showing the group videophone call process, and FIG. 8 shows an example of the screen for executing the group videophone call process.

In a step S11 of FIG. 7, the control unit 41 determines whether or not the command for executing the group videophone call process with plural addressee information data preliminarily registered in group has been received. If it is determined that the command for executing the group videophone call process using the plural addressee information data preliminarily registered in group has not been received, the process is brought into the standby state until reception of the command.

Figure 8A:
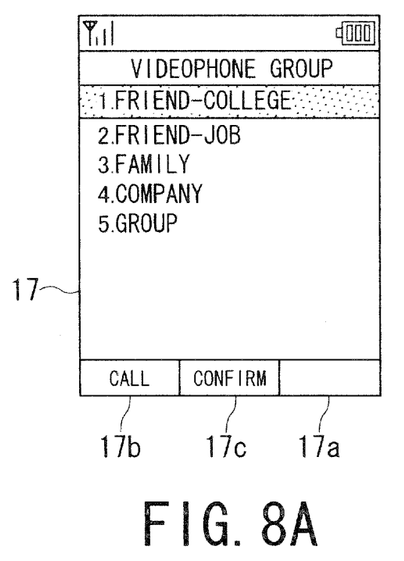
FIG. 8A shows a list of the group information.

When it is determined that the command for executing the group videophone call process using the plural transmission information data preliminarily registered in group has been received, the process proceeds to a step S12 where the information which relates to the group stored in the group DB 61 is read and displayed as the list shown in FIG. 8A.

Figure 8B:
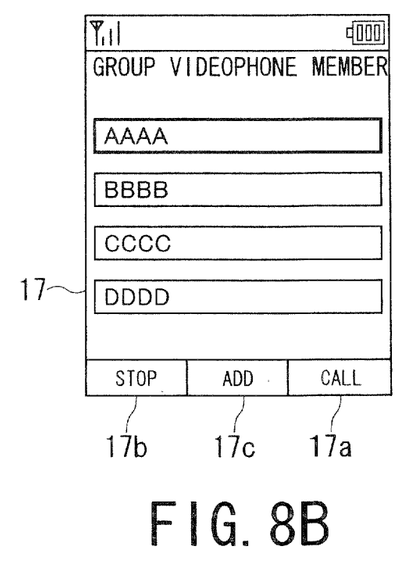
FIG. 8B shows a list of the selected members of the group.

In a step S13, upon reception of the command to select one group from the displayed list of the groups, the control unit 41 reads the addressee information of the group selected from those stored in the group DB 61 so as to be displayed as the group member list shown in FIG. 8B.

In a step S14, after reception of the command for executing the group videophone call, the control unit 41 sets all the group members as the addressees of the group videophone, and performs the group videophone call process simultaneously. Specifically, in response to depression of the first soft key 14a to which the "call" process is allocated as displayed on the soft key function display section 17a, the control unit 41 sets the group members as the addressees to execute the group videophone call process to the addressee information read from the group DB 61.

In the step S13, if the number of addressees as the members of the group receiving the selection is less than four as the maximum number of addressees, the addressee information of the group videophone may be added by depressing the return key to which the "addition" process is allocated as displayed on the return key function section 17*c*. Some of the displayed members may be deleted as well. The explanation with respect to the group videophone call process using the group register function is finished.

The group retrieval process before the group videophone call and during the group videophone communication will be described. The group retrieval process is executed for selecting the addressee information of the group videophone. The addressee information may be selected through the simple operation upon retrieval of the desired group from those stored in the group DB 61.

Figure 9:
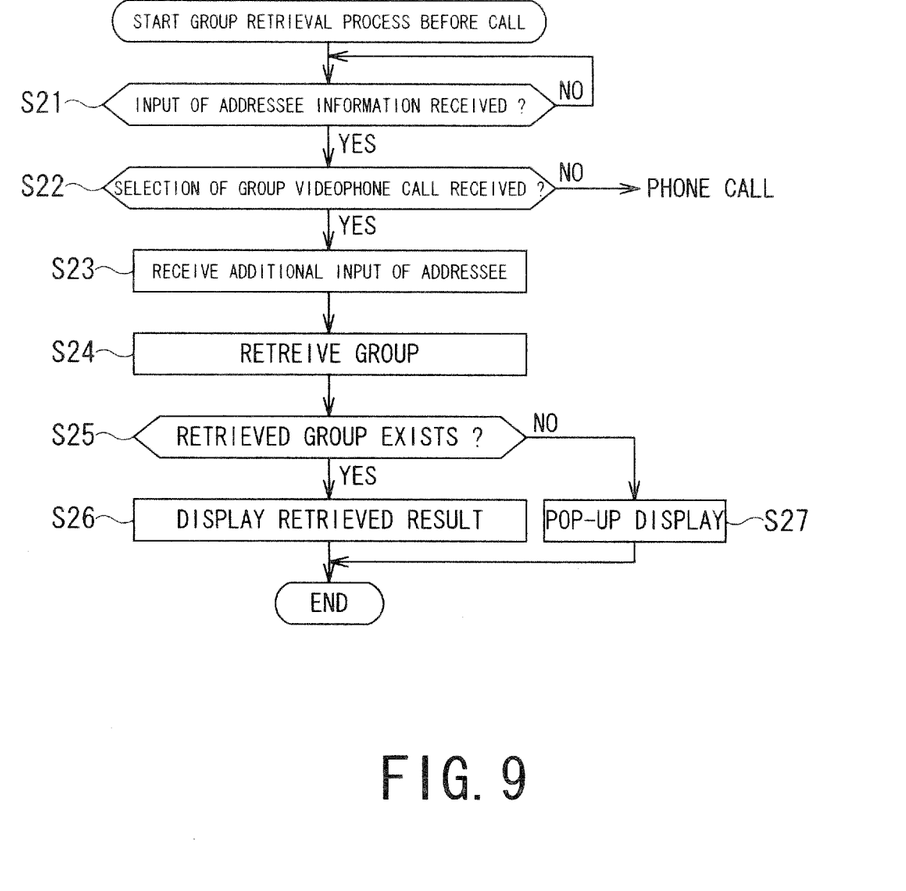
FIG. 9 is a flowchart showing a process for retrieving the group before calling.

FIG. 9 is a flowchart showing the group retrieval process executed before the group videophone call, and FIG. 10 shows an example of the group retrieval screen before the group videophone call.

In a step S21, the control unit 41 determines whether or not the input of the addressee information of the addressee required to establish the communication using the voice call mode and the videophone mode including the group videophone function has been received. The input of the addressee information is received using the address book and the transmission/reception record as the input unit. If it is determined that the input of the addressee information of the addressee required to have the communication has not been received, the control unit 41 brings the process into the standby state until reception of the command.

If it is determined that the input of the addressee information of the addressee required to have the communication has been received, the process proceeds to a step S22 where the control unit 41 determines whether or not the phone call to the addressee based on the addressee information having the input received in addressee information input reception step S21 has been selected using the group videophone function in the videophone mode.

If it is determined that the received call is selected in the voice call mode or the videophone mode to the single addressee rather than the one using the group videophone function, the control unit 41 calls the addressee based on the input addressee information using the voice communication mode or the videophone mode to the single addressee.

Figure 10A:
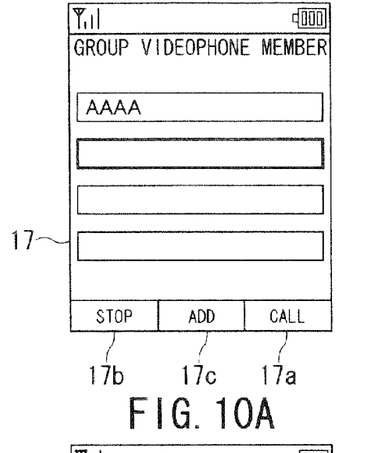
FIG. 10A shows the displayed member.

On the other hand, when the selection of the call using the group videophone function has been received, the process proceeds to a step S23 where the control unit 41 displays the group videophone member display screen shown in FIG. 10A to receive the additional input of the addressee information of the addressee of the group videophone call. On the group videophone member display screen, the addressee based on the addressee information having the input received in the step S21, for example, "AAAA" is displayed as the addressee of the group videophone. When the return key to which the "addition" process is allocated as displayed on the return key function display section 17*c* is depressed, the command for adding the addressee is received to display the member selection menu screen as shown in FIG. 10B.

On the member selection menu screen, various functions for inputting the addressee information of the group videophone to be added are displayed. Functions added by inputting the desired addressee information from the address book, transmission/reception call record, and the transmission/reception mail record, or the data added by directly inputting the phone number will be displayed as options.

When the first soft key 14*a* to which the "call" process is allocated as displayed on the soft key function display section 17*a* is depressed, the control unit 41 calls the addressee inputted at that time using the videophone on the group videophone member display screen shown in FIG. 10A. In the example shown in FIG. 10A, the videophone call is made only to the addressee "AAAA".

Figure 10B:
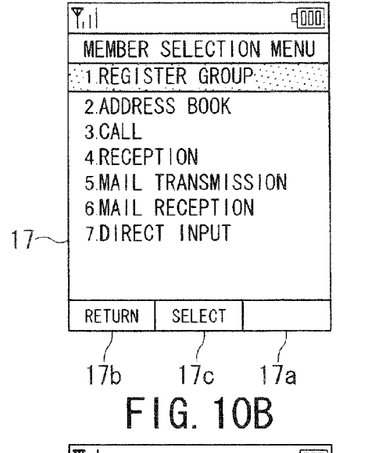
FIG. 10B shows a member selection menu.

In a step S24, when the command for adding the addressee information by selecting "1. register group" from the member selection menu is received, the group retrieval unit 62 executes the group retrieval process based on the addressee information having the input received in addressee information input reception step S21, and the addressee information having the addition input received on the member selection menu screen shown in FIG. 10B. For example, the group retrieval unit 62 retrieves the group which contains the addressee information of "AAAA" as the addressee having the input received in addressee information input reception step S21 from the groups stored in the group DB 61.

In a step S25, the group retrieval unit 62 determines whether or not the group which contains the addressee information having the input received in addressee information input reception step S21, and the addressee information having the addition input received on the member selection menu screen shown in FIG. 10B exists in the retrieved result obtained in group retrieval step S24. For example, the group retrieval unit 62 determines whether or not the group which contains "AAAA" exists in the obtained retrieved result.

Figure 10C:
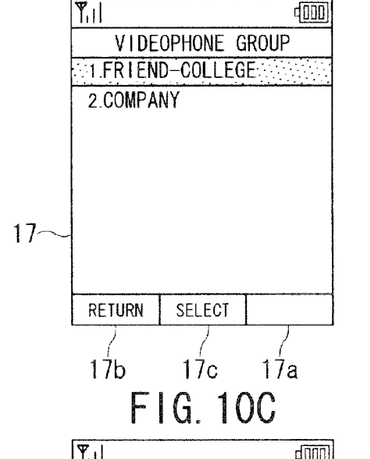
FIG. 10C shows the retrieved result.

If it is determined that the group which contains the addressee information having the input received in addressee information input reception step S21, and the addressee information having the addition input received on the member selection menu screen shown in FIG. 10B exists in the obtained retrieved result, the process proceeds to step S26 where all the corresponding groups are displayed on the main display 17 as the retrieved result. FIG. 10C shows the retrieved result display screen on which the group which contains "AAAA" as the group member corresponds to "friend-college" and "company".

Figure 10D:
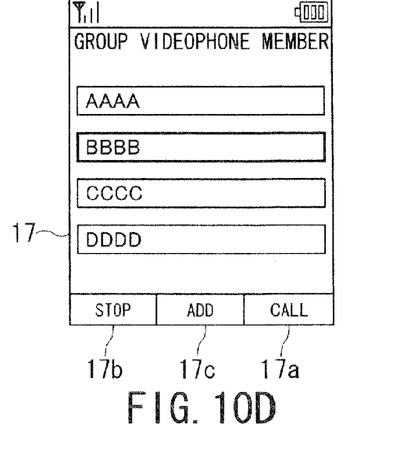
FIG. 10D shows a list of the members of the selected group.

When the "friend-college" is selected as the group required to have the group videophone call on the retrieved result display screen, the group retrieval unit 62 displays the list of the members of the "friend-college" including "AAAA", "BBBB", "CCCC" and "DDDD" as shown in FIG. 10D.

When depressing the first soft key to which the "call" process is allocated as displayed on the soft key function display section 17*a*, the control unit 41 sets all the group members as the addressees of the group videophone call to execute the group videophone call. If the number of the addresses as the group members is less than four, the return key to which the "addition" process is allocated as displayed on the return key function display section 17*c* so as to add the addressee information of the group videophone.

Figure 10E:
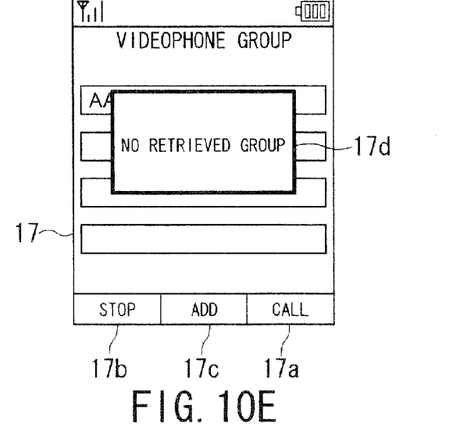
FIG. 10E is an explanatory view of the pop-up display.

If it is determined that the group which contains addressee information having the input received in addressee information input reception step S21 and the addressee information having the addition input received on the member selection menu screen shown in FIG. 10B does not exist in the group stored in the group DB 61 in determination step S25, the group retrieval unit 62 notifies of no corresponding group. The notification is displayed using the pop-up 17*d* as shown in FIG. 10E. The explanation of the group retrieval process executed before group videophone call is finished.

The group retrieval process may be executed upon communication using the videophone mode. When the number of the mobile phones which have already established communication does not reach the maximum value for the simultaneous communication, the group retrieval process upon the communication is executed for adding the member of the group videophone by retrieving the group which contains the addressee information relevant to the plurality of addressees during the communication.

The group retrieval process executed during the group videophone communication will be described.

Figure 11:
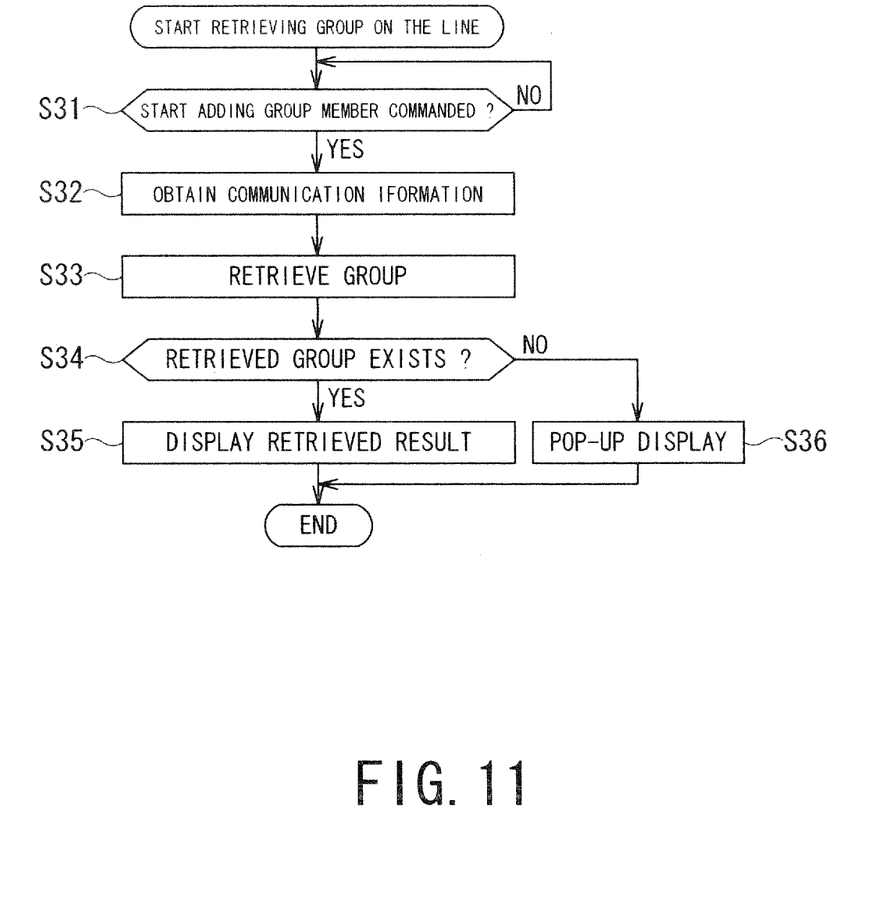
FIG. 11 is a flowchart showing the group retrieval process on the line.

FIG. 11 is a flowchart showing the group retrieval process executed during the group videophone communication, and FIG. 12 shows an example of the group retrieval screen displayed during the group videophone communication.

In the case where the communication between the addresser and at least one addressee is established, the control unit 41 determines whether or not the command for executing the group retrieval process among the preliminarily categorized and registered addressee information data has been received in the step S31. If it is determined that the command for executing the group retrieval process has not been received, the process is brought into the standby state until reception of the command.

Figure 12A:
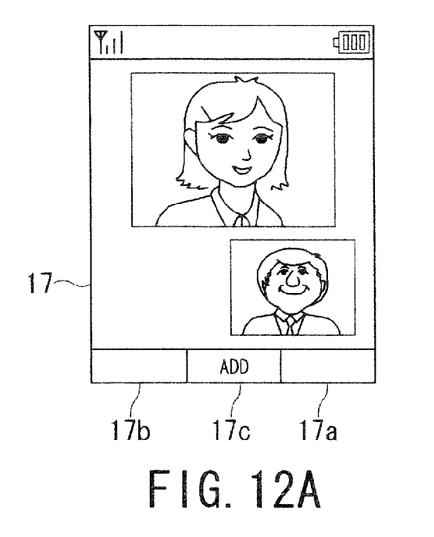
FIG. 12A shows the display on the line.

The command for executing the group retrieval process is received by depressing the return key to which the "addition" process is allocated as displayed on the return key function display 17c during the communication in the videophone mode shown in FIG. 12A.

If it is determined that the command for executing the group retrieval process has been received, the group retrieval unit 62 obtains the addressee information such as the phone number of the addressee on the line in the step S32.

The group retrieval unit 62 retrieves the group which contains the communication information which relates to "EEEE" obtained in communication information obtaining step S32 as the addressee information from the groups stored in the group DB 61 in the step S33.

In a step S34, the group retrieval unit 62 determines whether or not the group which contains the communication information obtained in communication information obtaining step S32 as the addressee information exists in the retrieved result obtained in group retrieval step S33. If it is determined that the group which contains the communication information obtained in communication information obtaining step S32 exists in the retrieved result, the process proceeds to a step S35. In the step S35, the group retrieval unit 62 displays all the corresponding groups which contain the communication information obtained in communication information obtaining step S32 as the retrieved results.

Figure 12B:
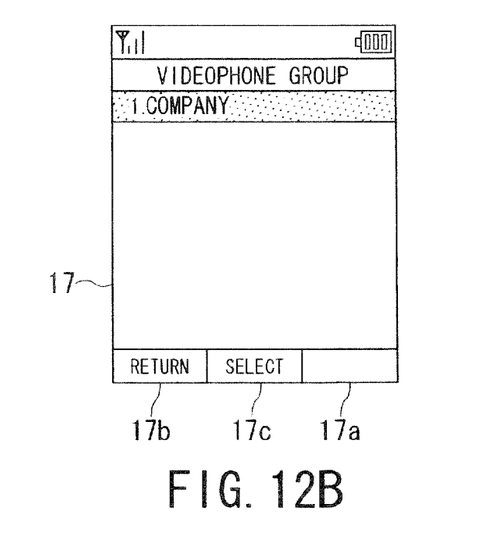
FIG. 12B shows the display of the retrieved result.

FIG. 12B shows the screen which displays the retrieved result when the group which contains the communication information that relates to the "EEEE" as the addressee information corresponds to "company".

Figure 12C:
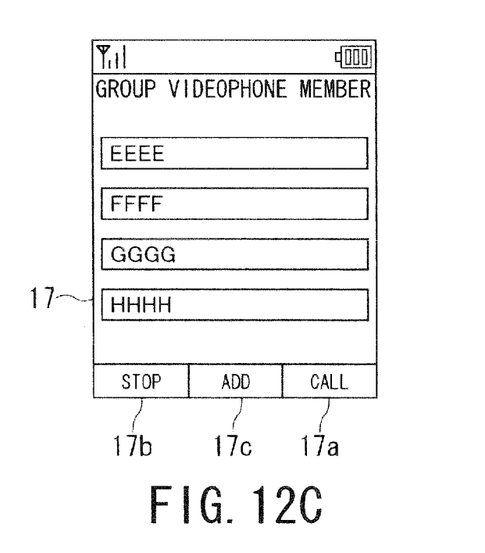
FIG. 12C shows the display of the members of the selected group.

If the "company" displayed on the retrieved result screen is selected, the group retrieval unit 62 displays the list of the members of the "company" group, that is, "EEEE", "FFFF", "GGGG", and "HHHH" as shown in FIG. 12C.

When the first soft key 14a to which the "call" process is allocated as displayed on the soft key function display 17a is depressed, the control unit 41 sets the group member on the line other than the "EEEE" as the addressee of the group videophone, and executes the group videophone call process simultaneously. If the number of the addresses as the group members is below the maximum number of four, the addressee information of the group videophone may be added by depressing the return key to which the "addition" process is allocated as displayed on the return key function display 17c.

On the other hand, if it is determined that the group which contains the communication information obtained in communication information obtaining step S32 in the retrieved result does not exist in the groups stored in the group DB 61, the group retrieval unit 62 notifies that no corresponding group exists. The notification may be displayed through the pop-up 17d as shown in FIG. 10E. The explanation with respect to the group retrieval process before group videophone call is finished.

Likewise the group retrieval process before group videophone call, the retrieval with respect to the group which contains "EEEE" as the member may be executed after receiving the command for selecting the "1. register group" from the member selection menu displayed on the screen as shown in FIG. 10B.

The explanation with respect to the group retrieval process during the group videophone communication is finished.

With the mobile phone 1, the categorized addressee information data of the group videophone are preliminarily registered, thus reducing the troublesome operation for selecting the plural addressee information data. This allows the user to efficiently select the addressee information. The group which contains the addressee information which relates to the selected or input addressee as the member may be easily retrieved using the group retrieval function so as to improve the operability when using the group register function.

During the communication in the videophone mode, the group that contains the addressee information relevant to the addressee on the line as the group member and the addressee information relevant to the other group member are retrieved on the basis of the registered categorized information, thus further improving convenience of the group videophone.

The present invention may be applied to a PDA, a personal computer, a mobile game device, a mobile music player, a mobile video player, and other mobile terminal devices in addition to the mobile phone 1 according to the present embodiment.

The series of the process explained in the embodiment of the present invention may be executed not only by software but also by hardware.

What is claimed is:

1. A mobile terminal device comprising:
an input unit configured to input addressee information including at least phone numbers of addressees for videophone communications;
a data storage configured to store, as one of a plurality of groups, a plurality of the addressees inputted by the input unit;
a retrieval unit configured to selectively retrieve groups from the plurality of groups stored in the data storage unit based on addressee information;
a set unit configured to set an addressee or addressees of a videophone communication; and
a communication unit configured to execute the videophone communication based on the addressee information of the addressee or addressees of the videophone communication set by the set unit,
wherein once the set unit has set a first addressee and the communication unit has executed a first videophone communication based on the addressee information of the first addressee:
the retrieval unit is configured to retrieve a first group, which includes the first addressee, from the plurality of groups stored in the data storage unit;
the set unit is configured to set one or more additional addressees for the first videophone communication, in addition to the first addressee, to addressees that are included in the first group; and the communication unit is configured to additionally execute the first video communication based on the addressee information of the one or more additional addressees set by the set unit.

2. The mobile terminal device according to claim 1, further comprising a notifying unit configured to notify absence of a retrieved group when a result of retrieving one of groups stored in the data storage unit by the retrieval unit indicates absence of the retrieved group.

3. A mobile terminal device comprising;
- an input unit configured to input addressee information including at least phone numbers of addressees for videophone communications;
- a data storage unit configured to store, as one of a plurality of groups, a plurality of the addressees inputted by the input unit;
- a controller configured to retrieve, after setting a first addressee as an addressee of a first videophone communication, the group that includes the first addressee from the plurality of groups stored in the data storage unit using the first addressee and to display the retrieved group on a display; and
- a communication unit configured to execute the first videophone communication based on the addressee information of the first addressee,
- wherein when the retrieved group is selected through the display screen:
  - the controller is further configured to set one or more additional addressees for the first videophone communication, in addition to the first addressee, to addressees that are included in the retrieved group; and
  - the communication unit is configured to additionally execute the first video communication based on the addressee information of the one or more additional addressees set by the set unit.

4. The mobile terminal device according to claim 3, wherein when a result of retrieving a group indicates absence of the group, the controller notifies the absence of the group.

* * * * *